United States Patent
Yamamoto et al.

(10) Patent No.: US 6,904,227 B1
(45) Date of Patent: Jun. 7, 2005

(54) DEVICE AND METHOD FOR EDITING VIDEO AND/OR AUDIO DATA RECORDED IN A DISC STORAGE MEDIUM

(75) Inventors: Naoto Yamamoto, Tokyo (JP); Shoji Yachida, Tokyo (JP); Toyokazu Narumi, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/504,431

(22) Filed: Feb. 15, 2000

(30) Foreign Application Priority Data

| Feb. 15, 1999 | (JP) | 11-036248 |
| Feb. 15, 1999 | (JP) | 11-036313 |
| Feb. 15, 1999 | (JP) | 11-036325 |

(51) Int. Cl.[7] .............................................. H04N 5/93
(52) U.S. Cl. ............................ 386/52; 386/95; 386/125; 386/126
(58) Field of Search ............................. 386/46, 52, 55, 386/125, 126, 95, 124; H04N 5/93

(56) References Cited

U.S. PATENT DOCUMENTS

| 5,949,953 A | * | 9/1999 | Shirakawa et al. | 386/70 |
| 6,181,870 B1 | * | 1/2001 | Okada et al. | 386/95 |

FOREIGN PATENT DOCUMENTS

| JP | A 6-150625 | 5/1994 | |
| JP | A 6-348572 | 12/1994 | |
| JP | A 80-289248 | 11/1996 | |
| JP | A 8-339194 | 12/1996 | |
| JP | 9-139910 | 5/1997 | |
| JP | 10-66087 | 3/1998 | |
| JP | 10-112144 | 4/1998 | |
| JP | 10-116204 | 5/1998 | |
| JP | 10-126743 | 5/1998 | |
| JP | A 10-282972 | 10/1998 | |
| JP | 10-290430 | 10/1998 | |
| JP | 10-294927 | 11/1998 | |
| JP | 10-327417 | 12/1998 | |
| JP | 10-336586 | 12/1998 | |
| JP | 10-336652 | 12/1998 | |
| JP | 11-27634 | 1/1999 | |
| WO | Wo9222983 | * 12/1992 | ......... H04N/5/781 |
| WO | 97/32437 | 9/1997 | |

* cited by examiner

*Primary Examiner*—Vincent Boccio
(74) *Attorney, Agent, or Firm*—Young & Thompson

(57) ABSTRACT

Management data such as title files of the contents like stored video programs, contracted video files (thumbnail index files) showing the contents, position data of the data of contents, etc. are stored at one time in a particular region of a disc storage medium. Position data of I-Pictures are stored for every unit of GOP, and the I-Pictures are successively picked up and reproduced according to a predetermined order.

4 Claims, 14 Drawing Sheets

| GOP INDEX | ECC addr. | ECC blk.No. | I-Pic blk.No. | Start Frm | End Frm | Audio Offset | Audio ECC |
|---|---|---|---|---|---|---|---|
| 9 | 280 | 12 | 2 | 1 | 15 | 11 | 1 |
| 10 | 292 | 13 | 3 | 1 | 15 | 12 | 1 |
| 11 | 305 | 13 | 3 | 1 | 15 | 12 | 1 |
| ... | | | | | | | |
| 34 | 617 | 12 | 2 | 1 | 15 | 11 | 1 |
| 35 | 629 | 12 | 2 | 1 | 15 | 11 | 1 |

| GOP INDEX | ECC addr. | ECC blk.No. | I-Pic blk.No. | Start Frm | End Frm | Audio Offset | Audio ECC |
|---|---|---|---|---|---|---|---|
| 9 | 280 | 12 | 2 | 1 | 15 | 11 | 1 |
| 10 | 292 | 13 | 3 | 1 | 4 | 12 | 1 |
| 35 | 629 | 12 | 2 | 13 | 15 | 11 | 1 |

I1 B2 B3 P4 B5 B6 P7 B8 | B9 P10 B11 B12 | P13 B14 B15

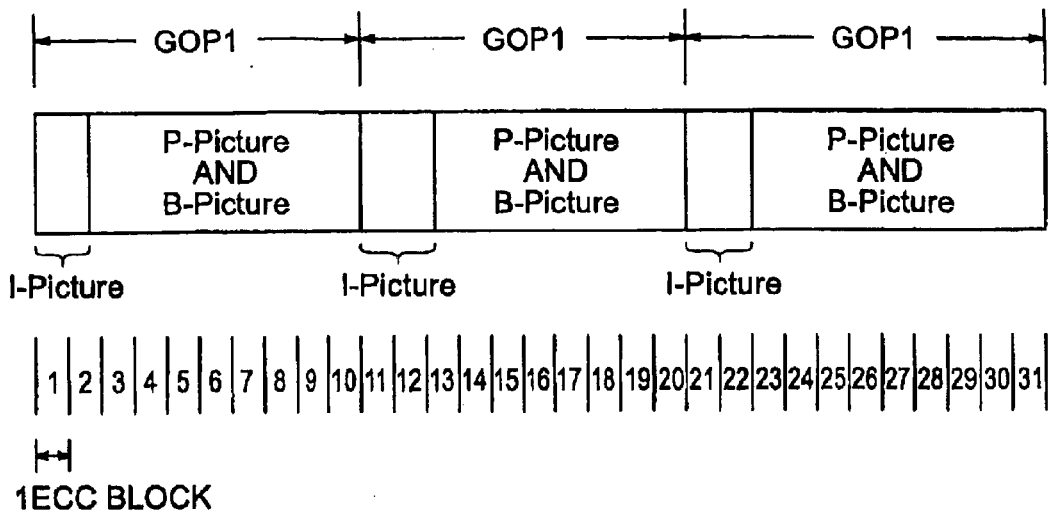
FIG. 18
FIG. 19
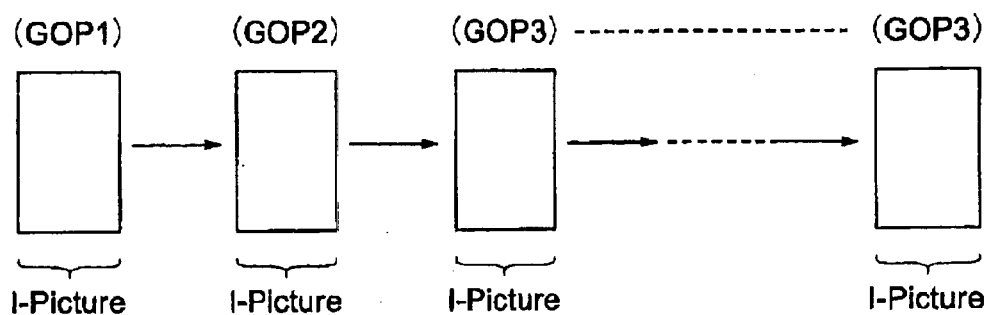
FIG. 20

STEREOPHONIC 1 CHANNEL

STEREOPHONIC 2 CHANNELS

MONOPHONIC

SUBVOICE

DEVICE AND METHOD FOR EDITING VIDEO AND/OR AUDIO DATA RECORDED IN A DISC STORAGE MEDIUM

BACKGROUND OF THE INVENTION

The present invention relates to technology for managing a plurality of contents that are recorded or stored in a disc recording medium such as large-capacity optical disc, magnetic-optic disc or the like. In particular, the present invention is adapted to managing the contents recorded in a large-capacity disc storage medium. The invention is further adapted to managing the contents recorded in a plurality of disc storage media accommodated in a cartridge.

The following description deals with a case where the disc storage medium is an optical disc. However, the invention is in no way limited to the optical disc only but can be applied to any other disc storage medium such as magnetic-optic disc, magnetic disc or the like disc.

The disc storage medium of a large capacity storing video contents (or musical contents) can be represented by a DVD-ROM. However, the DVD-ROM is constituted in a read-only fashion, and there is no need of changing the whole management data even though a plurality of video contents may have been stored therein. In the DVD-ROM, a plurality of video contents are never stored across the plurality of pieces of disc storage media.

On the other hand, there has been proposed an optical disc of a large capacity capable of storing a plurality of video contents in a piece of or a plurality of pieces of disc storage media.

In order to efficiently store video or audio, furthermore, there have been developed various compression/encoding technologies. For example, there has been known a JPEG video encoding system for encoding a still video in a compressed manner. As a system for encoding dynamic video in a compressed manner, there has been employed an MPEG2 video encoding system. On the other hand, the system for encoding audio signals in a compressed manner can be represented by an MPEG audio encoding system or a DOLBY AC system.

By using an optical disc of a large capacity capable of storing a plurality of video contents in a piece of disc like a video tape, it is allowed to store a plurality of video contents in a piece of optical disc. In this case, it is desired that the titles and contents of the stored video contents (or musical contents) can be recognized as an index at a glance. Without such an index or management data, the user feels it cumbersome to manage the stored video contents (or musical contents).

By using the optical disc of a large capacity which enables the user to record and reproduce the data, the user is allowed to erase or edit the data just like when he uses a video tape. For example, when the video contents are stored, he may wish to cut the data in the commercial message times. To erase the data of commercial message times using the conventional video tape, the data must be recorded again on another video tape excluding the data of commercial message times.

The disc storage medium, on the other hand, is accessible in a random fashion. This, therefore, makes it possible to so edit as to delete the data of commercial message times and to jump to a position from where the succeeding video of the contents starts. Hence, playback operation is effected without causing the user to feel that the data of commercial message times are cut. This is the editing specific to the disc storage medium. However, there is no proposal concerning how the file management data for executing the editing be constituted and edited.

Further, the user himself is allowed to exchange the video and music by editing the contents, and to combine them together not only to erase them. For example, the background music of the video can be entirely exchanged. In effecting this editing, however, nothing has been proposed concerning how the edited contents be managed.

It can further be contrived not to record/playback data to and from a piece of disc storage medium as a unit, but to accommodate a plurality of disc storage media in a cartridge and record/playback data to and from a cartridge as a unit. When the storage of a plurality of contents is taken into consideration, further, the management of the cartridge as a unit is easier. However, nothing has been proposed concerning the management of a number of contents stored in a plurality of pieces of disc storage media in a cartridge.

Besides, no management has been proposed when a plurality of disc storage media are accommodated in a cartridge, and the contents are recorded across the plurality of disc storage media.

SUMMARY OF THE INVENTION

It is an object of the present invention to provide a disc storage medium which enables the user to store and manage the titles representing a plurality of contents stored in a piece of or in a plurality of pieces of disc storage media.

Another object of the invention is to provide a disc storage medium which enables the user to edit the recorded contents, i.e., to erase or combine the recorded contents.

A further object of the invention is to provide a method of managing the file of when the user has edited the contents.

A still further object of the invention is to provide recording and playback devices and recording and playback methods using the above disc storage medium and the management method.

A yet further object of the invention is to provide a recorded video playback device and a recorded video playback method capable of easily carry out the playback of the quickly fed video for assisting the editing operation or for assisting the retrieval of a desired content.

A further object of the invention is to provide a recorded video playback device and a recorded video playback method capable of editing audio data separately from the editing of the video at the time of editing the audio.

In the present invention, management data for the data stored in the disc storage medium, are stored, as file management data, in a predetermined region secured in advance in the disc storage medium. The stored file management data include a title management file. The title management file includes a title of the content that is stored, an object type of attribute data representing the kind of content, data related to the storing, such as starting date data of the storing, ending date data of the storing, and the like data. The file management data further include an outline data file that shows the content. The file management data further include a program management file (program playback chain, hereinafter referred to as PPC file) that is used for editing the recorded data file and represents the relation of combination of the edited data files. The file management data further include data related to the storing, such as starting date data of the storing, ending date data of the storing, and a correlation management file showing a relationship between the program management file that makes reference to data file and the data file. The file management data further include a last play file representing the position data (so-called bookmarker function) in the content that was accessed last.

Here, the outline data include character data representing the summary of contents and thumbnail video which is a contracted image of the frame of the input video. In this invention, the outline data are hereinafter described as thumbnail data. The video compressing/encoding system employs MPEG2, and a predetermined processing unit including a plurality of frames is based on a GOP unit (group of picture), and the intraframe encoding video is referred to as I-Picture.

The video and audio are stored as an video/audio file. The video/audio file is constituted by a compression encoded video/audio data file (multi-media video file, hereinafter referred to as an MVF file) and a map file (MAP) for managing the MVF file of the video/audio data.

The map file includes an ECC (error correction code) block address from a head position of the MVF file that is compression-encoded for each of the GOP units, the number of ECC blocks of the object GOP, the number of ECC blocks of the I-Picture in the object GOP, and the position data of a start frame and an end frame for reproduce the data in the object GOP. The map file makes it possible to manage the compression-encoded video/audio data in a unit of the GOP. Upon possessing the ECC block address and the number of ECC blocks from the head position of the MVF file of audio data in the object GOP, further, it is allowed to edit the after-recording of audio data.

At the time of formatting the disc, a file management data region is formed in a head portion of the disc. The file management data include an item that can be formed by the user or that can be changed by editing and, hence, a predetermined volume is secured as a file management data region.

In this case, the quick-feed video can be formed by picking up and reproduce the I-Pictures only by giving attention to the I-Picture that is included in each unit of the GOP but that has not been compressed. To pick up the I-Picture, the position data of I-Picture are stored and the I-Picture is read out according to the position data.

In compressing the video, the I-Picture serves as a base for compressing the video of other frames. The I-Picture itself remains as a piece of frame video that is not compressed. Therefore, there arouses no problem even when the I-Picture only is reproduced being quickly fed.

According to the invention, there is provided a disc storage medium storing, in a predetermined region, file management data inclusive of position data of a program management file that manages the stream of a plurality of contents stored in a compression-encoded form by using a variable-length code.

The disc storage medium of the invention has a feature in that there are stored, as file management data, the position data of an intraframe encoding video and the number of blocks of the intraframe encoding video in a unit of a predetermined processing including a plurality of frames.

In the disc storage medium of the invention, the video and/or audio is stored as a data file compression-encoded by using a variable-length code. The file of video and/or audio data stored in the disc storage medium is constituted by a data file storing the stream of compression-encoded video and/or audio data in a unit of a block, and a map file that includes address data for managing the data file. It is desired that the map file includes position data of the intraframe encoding video and the number of blocks of the intraframe encoding video in a unit of a predetermined processing including a plurality of frames in the compression-encoded video and/or audio.

The file management data may include position data of the intraframe encoding video and the number of blocks of the intraframe encoding video, as well as position data of a start frame and position data of an end frame in a unit of a predetermined processing including a plurality of frames.

In the disc storage medium storing the video and/or audio as a data file that is compression-encoded by using a variable-length code, the file of video and/or audio data stored in the disc storage medium is constituted by a data file storing the stream of compression-encoded video and/or audio data in a unit of a block, and a map file that includes address data for managing the data file.

Further, the map file includes position data of the intraframe encoding video, the number of blocks of the intraframe encoding video, position data of the start frame and position data of the end frame in a unit of a predetermined processing including a plurality of frames in the compression-encoded video and/or audio.

The invention provides a playback method for reading file management data stored in a predetermined region of a disc storage medium when the disc storage medium is inserted in a disc playback device.

The playback method of the invention has a feature in that the position data of an intraframe encoding video and the number of blocks of the intraframe encoding video are stored in a unit of a predetermined processing including a plurality of frames, and the intraframe encoding video corresponding to a desired content are successively picked up and are reproduced according to a predetermined order for every unit of the predetermined processing according to the input of operation.

The invention further provides a playback device having a reading unit for reading file management data stored in a predetermined region of a disc storage medium when the disc storage medium is inserted in a disc playback device.

The disc playback device of the invention comprises a recording unit for recording the position data of the intraframe encoding video and the number of blocks of the intraframe encoding video in a unit of a predetermined processing including a plurality of frames, and a playback unit for successively picking up and reproduce the intraframe encoding video corresponding to a desired content according to a predetermined order for every unit of the predetermined processing according to the input of operation.

The invention further provides a method of recording video in a disc storage medium having a file management data region which is a particular region separate from the region for recording the data of contents by picking up, as map data, the position data in a unit of a predetermined processing including a plurality of compression-encoded frames at the time of recording the contents in the disc storage medium in a compression-encoded manner.

The method of recording video of the invention has a feature in that the position data of the intraframe encoding video and the number of blocks thereof are picked up as map data in a unit of a predetermined processing.

The invention further provides a device of recording video in a disc storage medium having a file management data region which is a particular region separate from the region for recording the data of contents by picking up, as map data, the position data in a unit of a predetermined processing including a plurality of compression encoded frames at the time of recording the contents in the disc storage medium in a compression-encoded manner.

The device of recording video of the invention has a pick-up unit for picking up the position data of the intraframe encoding video and the number of blocks thereof as map data in a unit of a predetermined processing.

The invention further provides a method of editing video by recording in a disc storage medium, as a map file, position data of the compression-encoded video and audio data in a unit of a predetermined processing including a plurality of frames, editing a file of the recorded video and audio data in a unit of the predetermined processing, storing the file in a program management file so as to specify the positions of the video data and audio data having continuing results of editing, and storing the program management file in a region for storing the file management data that manage the file of the disc storage medium.

The editing method of the invention has a feature in that the position data of the intraframe encoding video and the number of blocks thereof are recorded as a map file in the disc storage medium in a unit of a predetermined processing for compression-encoding the stored contents, the encoded video in the frames are successively picked up and are reproduced for every unit of the predetermined processing according to a predetermined order to form a quickly fed video, and the editing is effected while making a reference to the quickly fed video.

The invention further provides a device for editing video recorded in a disc storage medium. The device for editing the recorded video comprises a compression-encoding unit for compressing and encoding the content of video to be stored in a disc storage medium, a recording unit for recording the encoded video and audio data as data file for each of the contents, and a preparation unit for preparing a map file of position data of the recorded video and audio data. The device for editing the recorded video further comprises a decoding unit for reading and decoding the recorded data file, a memory unit for storing, as file management data, a program management file that manages the stream of data, and an input unit for inputting an editing instruction. The program management file stores the result of the data file erased or combined by an operation input through the input unit in a unit of a predetermined processing including a plurality of frames of the data file.

The device for editing the recorded video of the invention has a playback unit for picking up and reproduce the stored intraframe encoding video according to a predetermined order in compliance with the input of operation.

BRIEF DESCRIPTION OF THE DRAWINGS

FIG. 18 is a diagram illustrating the constitution of the GOP according to the invention;

FIG. 19 is a diagram illustrating the form of a MAP file;

FIG. 20 is a diagram illustrating the order of picking up the I-Pictures;

DESCRIPTION OF THE PREFERRED EMBODIMENTS

Figure 1:
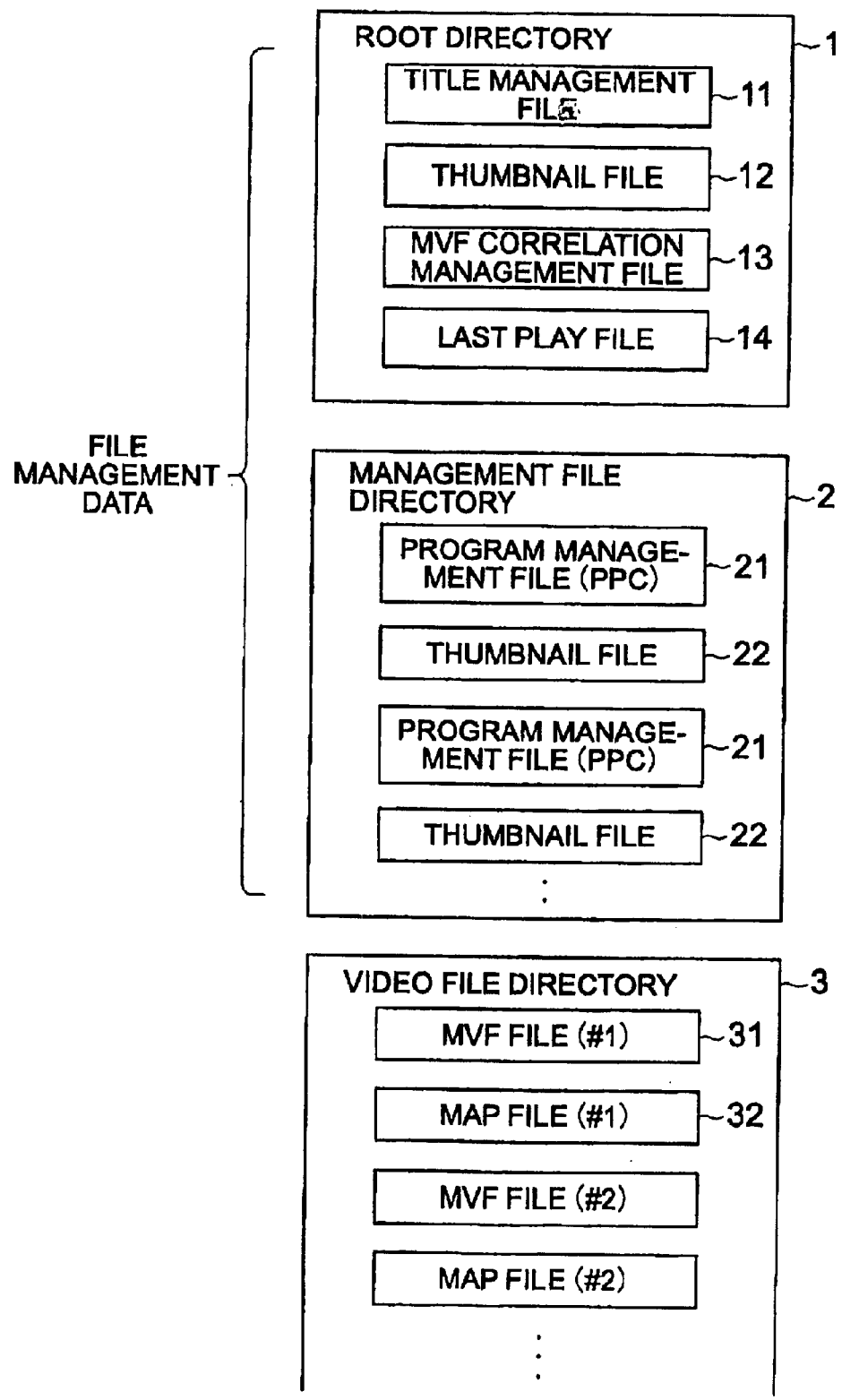
FIG. 1 is a diagram illustrating a relationship between a management file and a data file according to the invention.
Figure 2:
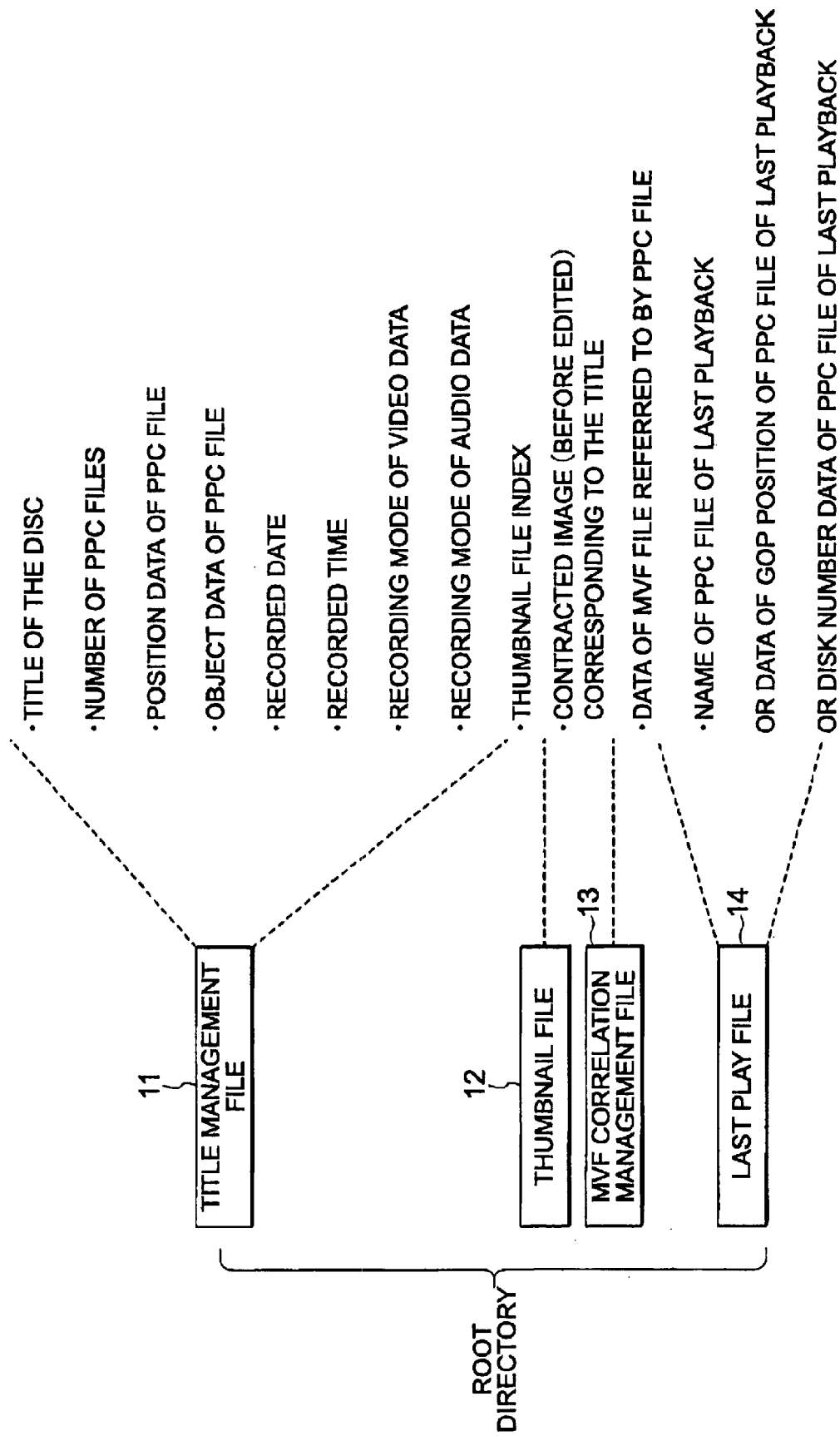
FIG. 2 is a diagram illustrating the constitution of a root directory shown in FIG. 1.
Figure 3:
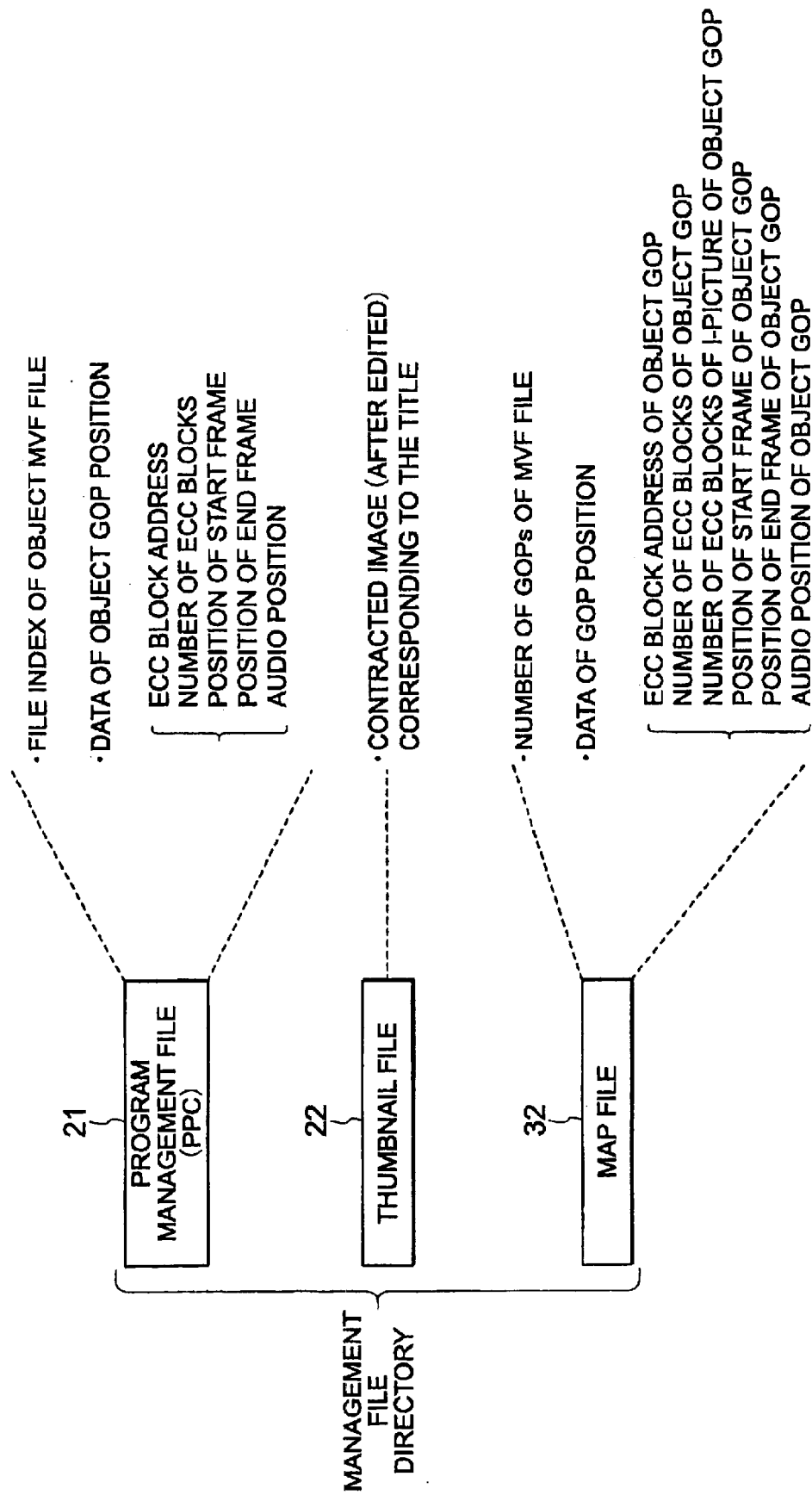
FIG. 3 is a diagram illustrating the constitution of a management file directory shown in FIG. 1.
Figure 4:
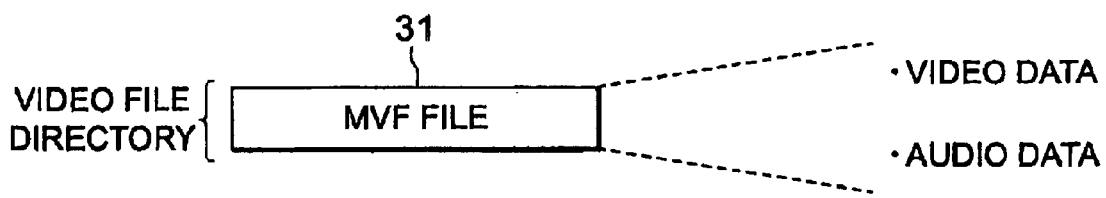
FIG. 4 is a diagram illustrating the constitution of a video file shown in FIG. 1.

An embodiment of the invention will now be described with reference to the drawings. FIG. 1 is a diagram illustrating the structure of a file provided in a disc storage medium according to an embodiment of the invention. FIG. 2 is a diagram illustrating the constitution of a root directory. FIG. 3 is a diagram illustrating the constitution of a management file directory. FIG. 4 is a diagram illustrating the constitution of a video file directory. In the following embodiment of the invention, the data stored or recorded in the disc storage medium are those that are compression-encoded by using the MPEG2 video encoding system and the MPEG audio encoding system.

Files recorded in a root directory 1 and in a management file directory 2 of FIG. 1 correspond to a file management data for managing the recorded contents. The file management data are stored or recorded in a particular region of the disc storage medium. This particular region has been secured in advance as the region for storing the file management data. In this particular region, the capacity of file management data varies due to recording and editing by the user. Therefore, a predetermined capacity is secured in advance at the time of initializing the disc.

The file management data are divided into the root directory 1 and the management file directory 2. The root directory 1 is constituted by a title management file 11, a thumbnail file 12, an MVF correlation management file 13, and a last play file 14.

The title management file 11 is the one for managing the contents of the disc or of the whole cartridge. As shown in FIG. 2, the title management file 11 stores and manages the volume name of the disc, content title, file number of the PPC file representing the number of contents in the disc, position data of the PPC file, object attribute data, date of recording, recording time, recording mode of the video data, recording mode of the audio data, index of the thumbnail, and the like data.

The object attribute data represent the kind, such as MPEG2 dynamic video, MPEG audio, DOLBY AC audio, JPEG still video and noncompressed still video data. When the contents are to be reproduced, the object attribute data instruct what kind of reproduction processing be carried out.

The index of thumbnail designates the data position in the thumbnail file 12. Referring to FIG. 2, the thumbnail file 12 is so recorded that the contents can be grasped together with the content title when the disc storage medium is inserted in the playback device, and stores a contracted still video image of about 100 pixels×75 lines. In this embodiment, the title management file 11 and the thumbnail file 12 are separated from each other. By using the thumbnail indexes in the title management file 11, the thumbnails of contents are stored in the thumbnail file 12. This is because, the thumbnail data require a larger storage capacity than the PPC file. When the contents are to be reproduced using a cheaply constructed recording/playback device without having a memory of a large capacity, the thumbnail file 12 is not read out but the title data recorded in the PPC file are read out. This enables the user to know the data of contents stored in the disc recording medium, and compatibility is maintained with recording/playback devices of different specifications. When the above plural kinds of specifications are not possessed, the thumbnail file 12 may be managed by being stored in the title management file 11.

Referring to FIG. 2, the MVF correlation management file 13 is the one for adjusting the conflict of video data stored in the video file directory 3 which is referred to by the PPC files which reproduce and control the recorded contents. The MVF correlation management file 13 stores whether the PPC files are making reference to the MVF file 31 in the video file directory 3. When the PPC files making reference to the MVF files are recorded, the following fact is realized when the contents are to be edited. For example, when it is attempted to erase the whole MVF file, the fact that it cannot be erased is notified to the user in case there exists a PPC file making reference to the MVF file that is to be erased. Or, the GOP data of the PPC file that must be changed as a result of erasing the MVF file, is reconstituted.

As shown in FIG. 2, the last play file 14 exhibits the so-called bookmarker function. In the last play file 14 are stored the PPC file name that is reproduced last by the user and the GOP position data of the PPC file reproduced last (last playback). When the disc storage medium is constituted by a cartridge, the last play file 14 stores the data such as disc number of the PPC file that was reproduced last. This is due to the following reasons. In the case of the recording/playback device using the tape storage medium, the user may discontinue the playback processing and may take it out from the device or may take it out from the device without rewinding it after the recording processing is finished. When the user inserts the tape storage medium again in the device, then, the tape storage medium remains halted at a position at where it was halted in the previous time. In the case of the disc storage medium, on the other hand, it is not possible to physically detect the position at where the head has halted. By recording the position of the content reproduced last in the last play file 14, therefore, the playback can be realized continuing from that of the previous time like with the recording/playback device using the tape storage medium.

When the user sets a notch for preventing the recording in order to prevent erroneous recording, the last play file 14 cannot be used since it has been inhibited to record the data on the disc storage medium. Upon storing an ID specific to the disc storage medium and the data of the last play file 14 in the nonvolatile memory in the recording/playback apparatus, however, it is allowed to realize the function equivalent to the last play file 14.

When the disc storage medium is accommodated in the cartridge, the nonvolatile memory is provided for the cartridge body and the data of the last play file 14 is stored therein to realize the function equivalent to the last play file 14.

Next, described below is the file of the management file directory 2. The management file directory 2 includes a PPC file 21, a thumbnail file 22, and a MAP file 32. They may be arranged in the same disc storage medium as the root directory or may be arranged in each of the disc storage media.

The PPC file 21 manages the stream of the contents and is used for editing and reproduce the recorded video contents. The PPC file 21 manages the object MVF file in a unit of GOP. As shown in FIG. 3, the PPC file 21 stores a file index of the object MVF file, an ECC block address from the head position of the MVF file that serves as position data of the object GOP for specifying the object GOP, number of the ECC blocks of the object GOP, number of the ECC blocks of the I-Picture included in the object GOP, start frame position and end frame position of the object GOP, start offset address of audio data included in the object GOP and the number of the ECC blocks thereof. Thus, the MVF file storing the object contents is accessed based on the data of the PPC file 21 to reproduce the contents.

Referring to FIG. 3, the thumbnail file 22 stores the thumbnail video of the MVF file 31 corresponding to the PPC file 21 as a still video image. The file structure of the thumbnail file 22 is the same as the thumbnail file 12 of the root directory 1.

The MAP file 32 is the one for managing the MVF file 31. Referring to FIG. 4, the MAP file 32 stores the number of total GOPs in the MVF file 31, an ECC block address from the head position of the MVF file of the object GOP representing the management data of the GOPs, number of the ECC blocks of the object GOP, number of the ECC blocks of the I-Picture in the object GOP, and the position data of the reproduction start frame and the position data of the end frame of the object GOP. For example, when the number of video frames in the GOP is 15, the start frame position which is 1 and the end frame position which is 15 are recorded. As for the audio data, the start position data of audio data in the object GOP and the number of the ECC blocks are stored. The MAP file 32 is provided for the MVF file 31, and is automatically prepared when the MVF file 31 is prepared (recorded). That is, when the MVF file 31 is prepared while recording a content, the management data is automatically taken in for every GOP to prepare the MAP file 32.

Next, the video file directory 3 will be described. As shown in FIG. 4, the MVF file 31 is the one for storing the video or audio data of the recorded contents. The MVF file 31 stores, for example, the data of video and audio signals compressed by MPEG2 being aligned (sectionalized) in a unit of GOP for each of video data and audio data in a unit of ECC block. Here, the number of frames constituting a GOP is, in many cases, 15 since the number of video frames per a second is 29.97 in the case of the NTSC system broadcasted in Japan, U.S.A. and in other countries. The number, however, is in no way limited thereto only. When a variable GOP structure is possessed, in particular, the number of the frames constituting the GOP is suitably changed depending on a scene change, etc. The compression-encoded data are read out from the MVF file and are decoded to reproduce the video data and audio data.

Figure 16:
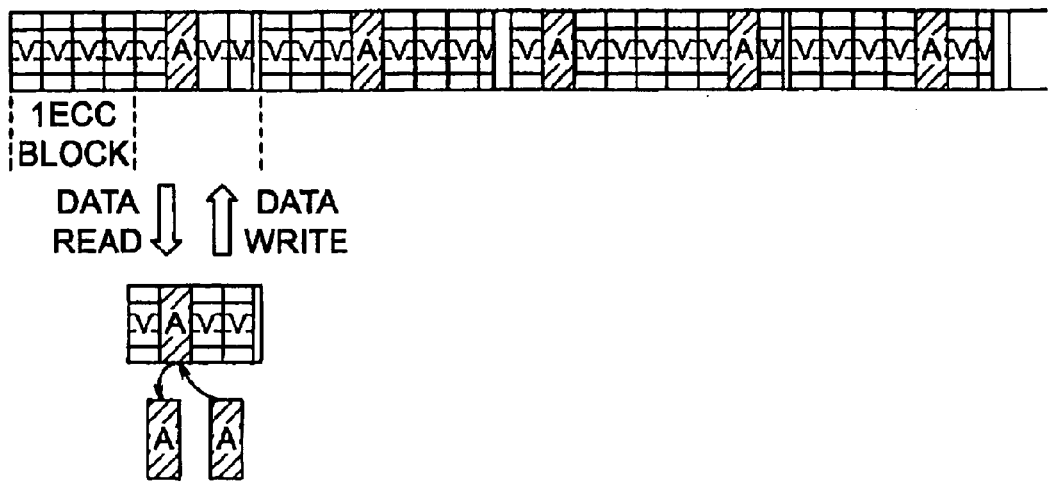
FIG. 16 is a diagram illustrating the arrangement of the compressed data.

FIG. 16 is a diagram illustrating the arrangement of compressed data used in the DVD-ROM. In FIG. 16, symbol V denotes compressed video data and A denotes compressed audio data. The data are stored in a unit of a sector (generally, 2 KB). In the MVF file of the invention, on the other hand, the compressed audio data are arranged in a unit of the ECC block after the compressed video data in the GOP data.

For example, when the audio data are to be exchanged, the format used for the DVD-ROM does not have data for managing the position of audio data. Further, the data arrangement has no regularity. Accordingly, a unit is necessary for successively reading all of the compression data of the required portion from the optical disc and for recording audio data that are to be newly exchanged therefor on a sector position that is judged to be a audio data portion. This means that the audio data cannot be easily exchanged.

Figure 17:
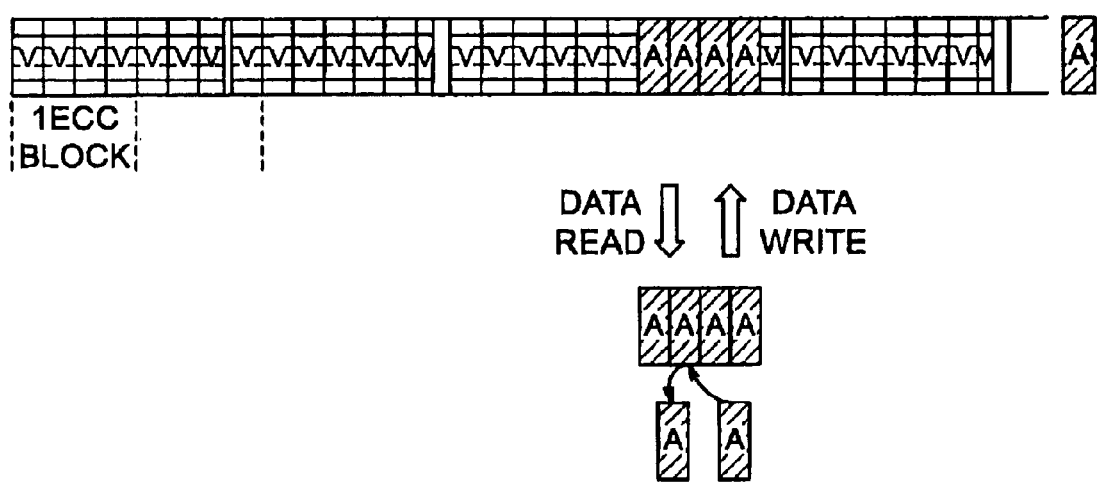
FIG. 17 is a diagram illustrating the arrangement of the compressed data according to the invention.

FIG. 17 is a diagram illustrating the arrangement of the compressed data according to the invention. Referring to FIG. 17, the MVF file having data arrangement of the invention arranges the data in a unit of the ECC block in addition to managing the audio data position by the MAP file 32. Therefore, the audio data can be exchanged without reading them out from the optical disc, offering an advantage.

When the audio data are to be added, there is considered, for example, a case where the audio data are recorded in Japanese using two channels and are then recorded in English using two channels. Here, it is presumed that the audio data region that are to be added in advance have been secured at the time of recording. In the format of the DVD-ROM, the audio data portion cannot be discriminated unless the compressed data of a required portion are all successively read out like when the audio data were exchanged as described above. With the data arrangement of this invention, on the other hand, the audio data portion only is read out from the optical disc according to the MAP file, and the additional audio is recorded in a region that has been secured in advance. Accordingly, the audio data can be easily added.

Besides, since the MAP file 32 has a start address of GOP and number of ECC blocks of the I-Picture in the GOP, it is allowed to learn a file address. However, since the region of the I-Picture necessary for quick preview has not been known, the compressed data must be decoded to detect an end point of I-Picture data or the header of the compressed data must be detected.

According to this invention, on the other hand, the number of ECC blocks is stored in the MAP file 32 that manages the GOP data in addition to storing the start address (same as the start address of GOP) of the I-Picture. It is therefore allowed to continuously effect the address jumping, to read the data of a required number of blocks and to effect the decoding without decoding the compressed data or detecting the header thereof. It is therefore made possible to preview the video more quickly than is done according to the prior art.

Figure 5:
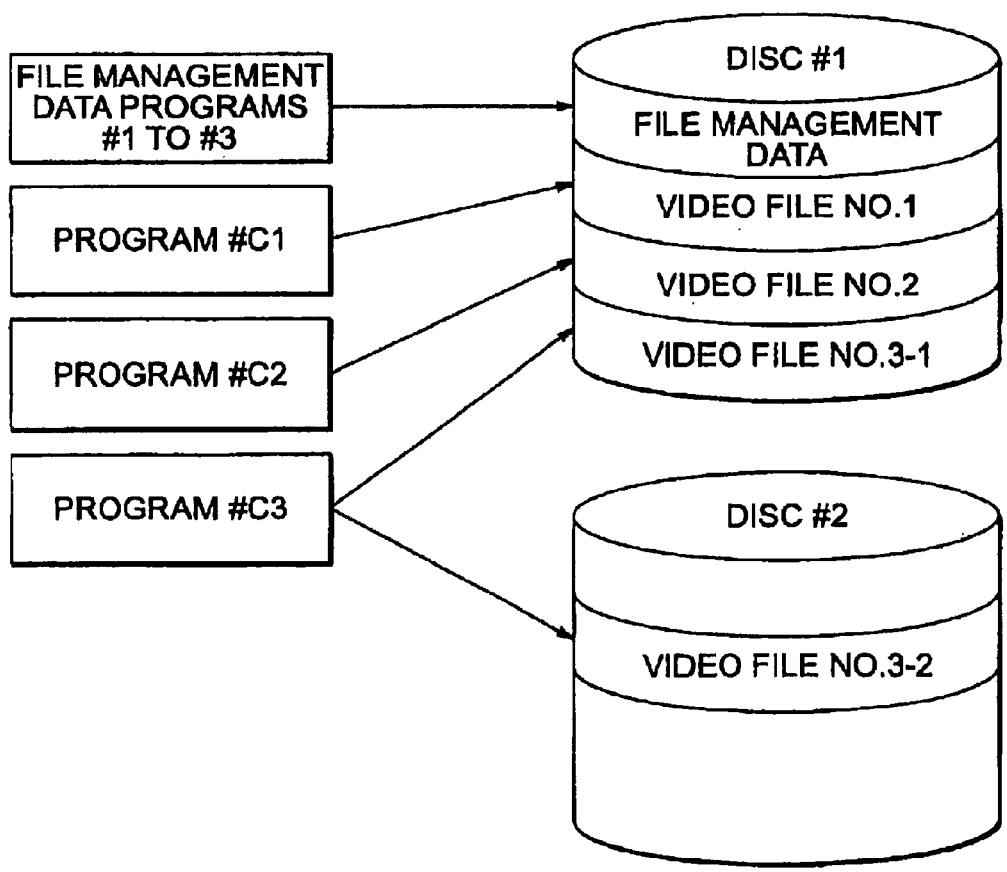
FIG. 5 is a diagram illustrating a relationship of files of when a plurality of contents are continuously stored in a plurality of pieces of disc storage media.

FIG. 5 illustrates a case where a cartridge holds a plurality of pieces of disc storage media. The disc storage media in the cartridge are so constructed that they cannot be taken out by the user. Here, in particular, the files have been so arranged that the contents can be recorded across the plurality of pieces of disc storage media. The disc #1 stores a content (program) #C1 as an MVF file No. 1 and a content #C2 as an MVF file No. 2. The disc #1 further stores one-half of the content #C3 as an MVF file No. 3-1. A disc #2 stores the remaining one-half of the content #C3 as an MVF file No. 3-2.

In this case, the file management data of the root directory file 1 are stored in a particular region at the head of the disc #1. The contents of the cartridge as a whole are managed by using the file management data, and the contents stored in the discs #1 and #2 are managed by using the management file directory 2 placed for each of the discs. Playback or recording the data in a state in which the plural pieces of disc storage media are held in a cartridge, is convenient for the user from the standpoint of management. Many contents stored in the plurality of pieces of disc storage media held in the cartridge are managed in a manner as described below. When the cartridge is inserted in the recording/playback device, the file management data placed on the root directory are recorded on the disc storage medium that is loaded first. Thus, the user is allowed to learn the contents in the whole cartridge faster than when the management data of the root directory are stored in each of the plurality of pieces of disc storage media.

As described above in detail, the present invention offers a great value of use even in regard to that many contents stored in the plurality of pieces of disc storage media are managed at one time by the file management data stored in a predetermined piece of disc storage medium.

Figure 6:
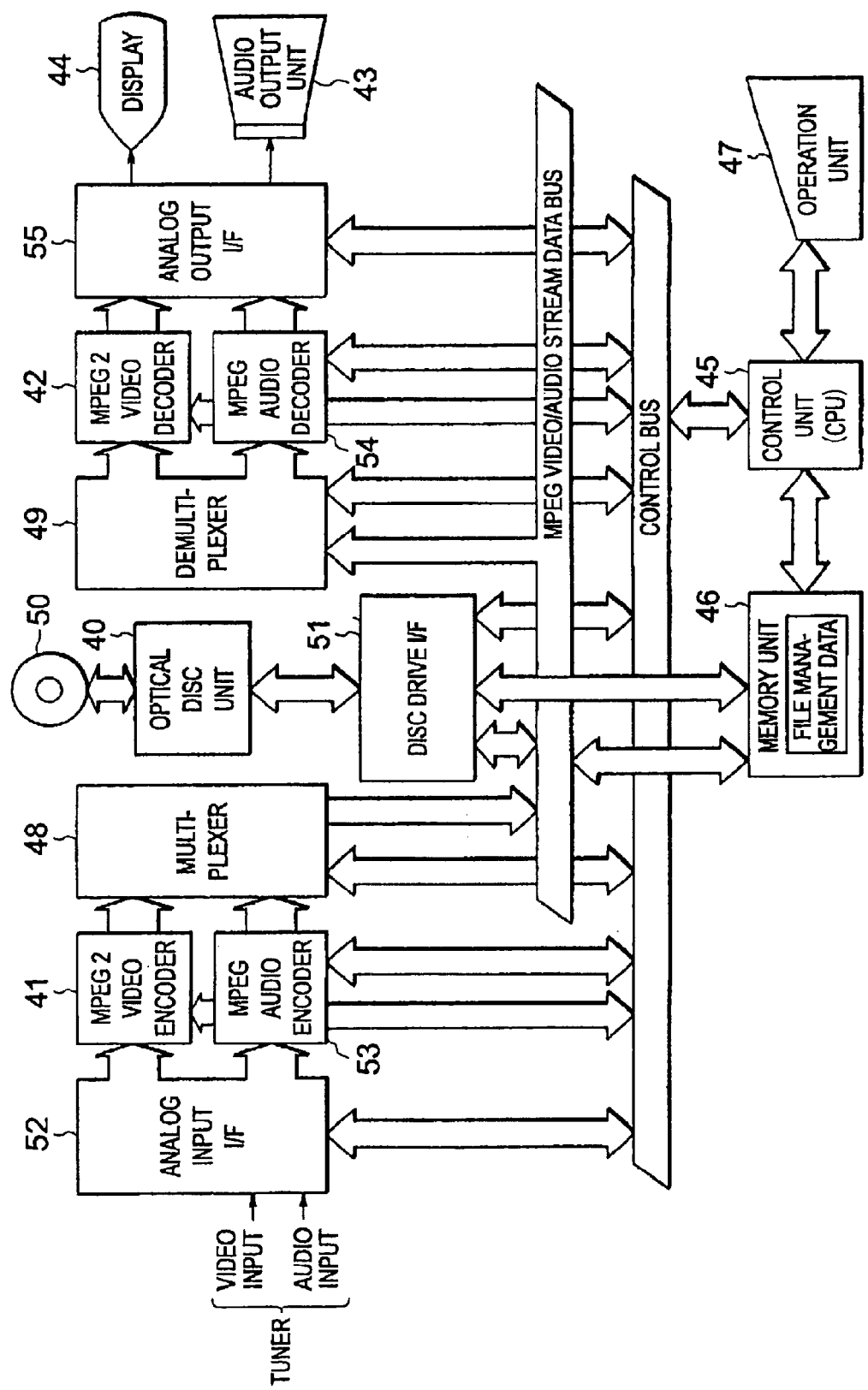
FIG. 6 is a diagram illustrating the structure of a disc recording/playback device used in the invention.

Next, FIG. 6 illustrates the constitution of a recording/playback device using the optical disc of a large capacity to explain the operation of the invention. The recording/playback device includes an optical disc unit 40 that makes access to an optical disc 50. An analog input interface (hereinafter abbreviated as I/F) 52 subjects the video data/audio data input from a tuner and other recording/playback devices to the A/D conversion. An MPEG2 video encoder 41 compresses and encodes the video data relying on the MPEG2 encoding system. An MPEG audio encoder 53 compresses and encodes audio data relying on the MPEG audio encoding system. A multiplexer 48 constitutes the compressed video data and audio data into a stream. A disc drive I/F 51 inputs and outputs the multiplexed data and management file data to and from the optical disc unit 40.

A demultiplexer 49 separates the compressed video data from the audio stream. An MPEG2 video decoder 42 decodes the compressed video data. An MPEG audio decoder 54 decodes the compressed audio data. An analog output I/F 55 subjects the decoded video data/audio data to the D/A conversion. A display 44 displays the video data. An audio output unit 43 produces the audio data. A control unit 45 controls the whole recording/playback device. A memory unit 46 stores control programs, file management data, and the like data. The memory unit 46 is managed by the control unit 45. An operation unit 47 inputs instructions such as editing, playback, etc.

Here, the multiplexer 48 rearranges the compressed video data and audio data for every GOP, so that the video data and the audio data are aligned in a unit of ECC block. The multiplexer 48 produces the rearranged data as a stream to the disc drive I/F 51. At the same time, the multiplexer 48 produces the number of ECC blocks for every GOP, number of ECC blocks of I-Pictures, ECC offset address of the audio data and number of ECC blocks of the audio data to the memory unit 46 through a control bus. The control unit 45 receives management data from the multiplexer 48 for every GOP, executes the processing for the MAP file data, and updates the memory unit 46.

When the recording operation is finished, the MAP file 32 is output to the management file directory 2. The disc drive I/F 51 is connected to the optical disc unit 40, MPEG video and audio stream bus and control bus. In order to smoothly control the data, the disc drive I/F 51 is equipped with a buffer memory. FIG. 6 shows only an example of the recording/playback device, but the invention is in no way limited to the constitution of this recording/playback device only.

Figure 7:
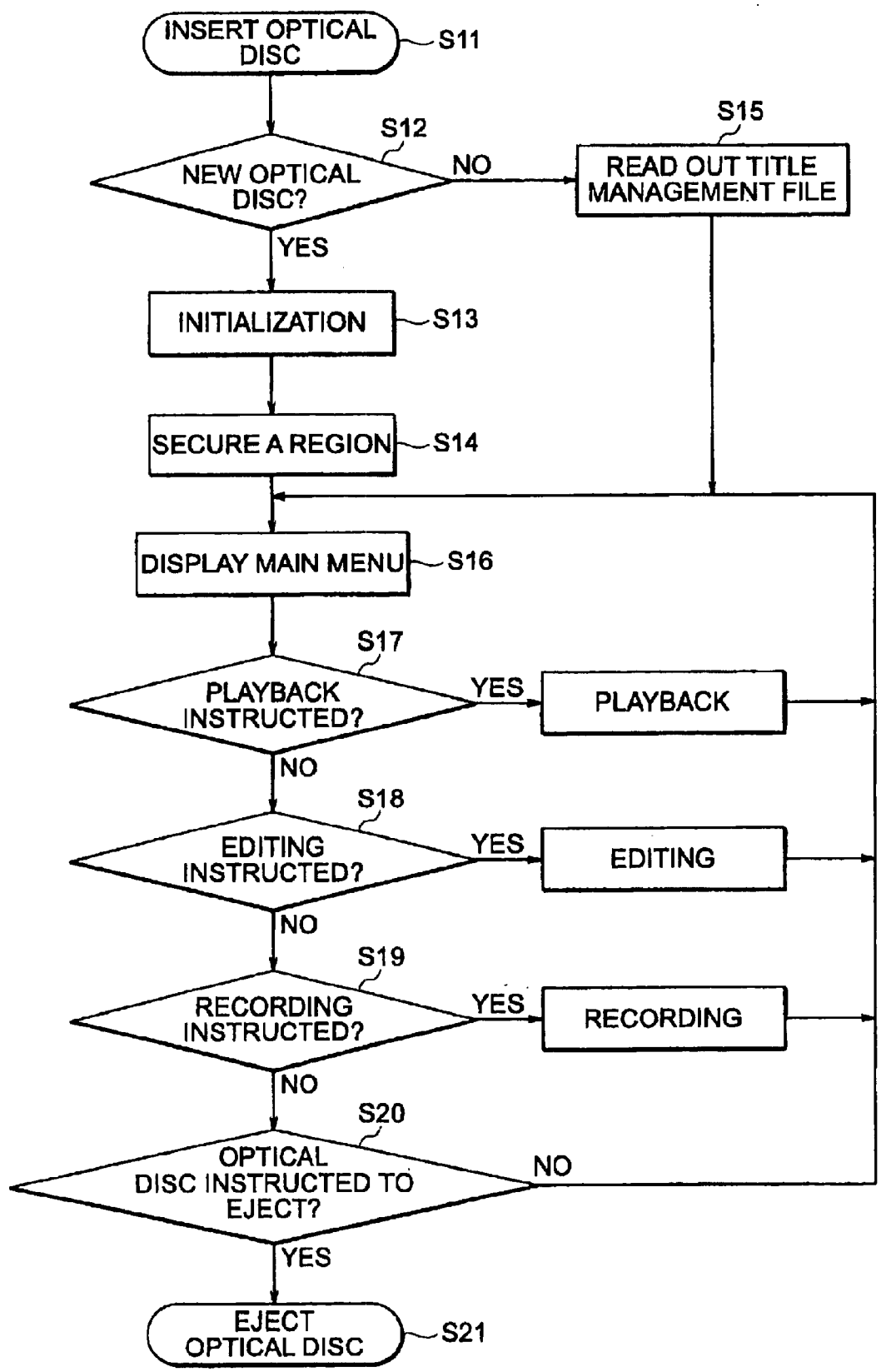
FIG. 7 is a flow chart illustrating the whole operation of the disc recording/playback device of the invention.

Next, the entire operation of the recording/playback device will be described with reference to FIG. 7 which is a flow chart illustrating the entire operation of the recording/playback device of the invention. When the optical disc 50 is inserted in the optical disc device 40 at step S11, the optical disc device 40 judges whether the optical disc 50 is a new one (step S12). When it is judged that the optical disc is the new one, the optical disc device 40 initializes the optical disc 50 (step S13) and secures a region in the optical disc 50 for the root directory 1 and management file directory 2 shown in FIG. 1 (step S14). When the optical disc is not the new one, the optical disc device 40 reads the title management file 11, the thumbnail file 12, and the last play file 14 at step S15. The data that are read out are stored in the memory unit 46, and a main menu is displayed on the display 44 (step S16).

When the optical disc 50 is not the new one, the content title and the corresponding thumbnail that have been stored already are displayed as the main menu. When the end point of the previous time read out from the last play file 14 is to be reproduced, the end position of the playback is displayed. When the end point of the previous time read out from the last play file 14 is to be recorded, the start position of recording is displayed. There are further displayed the data related to the recordable time of the optical disc 50.

Accordingly, the recording/playback device becomes capable of accepting an instruction from the operation unit 47. In response to a playback instruction (step S17), an editing instruction (step S18) and a recording instruction (step S19) from the operation unit 47, therefore, the recording/playback device commences the respective operations. When an instruction is input from the operation unit 47 to take out the optical disc 50 (step S20), the optical disc 50 is taken out (step S21).

Next, described below is the operation at the time of recording. At the time of recording, record start date data are automatically recorded in the title management file 11 of the root directory 1 based on the data from the timekeeping unit contained in the device. At the time of ending the recording, the record time length data are automatically recorded in the title management file 11 of the root directory 1. As the data to be recorded, there are stored in the title management file 11 the recording date, recording time, recording time length, and recording mode. Further, the titles can be input as character data so that the contents can be easily distinguished by the user. The title is capable of automatically describing the decoded data of overhead data EPG (electric program guide) of the digital broadcast, etc. When the plural pieces of disc storage media are to be managed being held in one cartridge, the title management file 11 stores the identification data ID for discriminating the number of pieces of disc storage media in the cartridge and for discriminating the individual disc storage media.

At the start of recording the contents, further, a first video is automatically recorded as a thumbnail video in the thumbnail file 12 of the root directory 1. After the contents have been recorded, however, this video may be replaced by any video by the user.

When the video contents are to be recorded in the video file directory 3, the video data are compressed by the MPEG2 compression-encoding system and the audio data are compressed by the MPEG audio encoding system. The compression-encoded data are recorded in the MVF file 31 as a stream in a unit of GOP while being sectionalized in a unit of an ECC block. Here, the stream in the GOP is arranged in order of compressed video data and compressed audio data. Further, the ECC block generally has a size of about 32 KB. However, the same effect is obtained even in other units.

Here, the MAP file 32 that manages the MVF file 31 in a unit of GOP stores, in the file management directory 2, an ECC block address from the head position of MVF file of the object GOP, number of ECC blocks of the object GOP, number of ECC blocks of the I-Picture in the object GOP, start frame position and end frame position in the object GOP in a unit of GOP based on the MVF file 31. As audio data, further, there are stored in the file management directory 2 an offset address of the compressed audio data from the ECC block address of the object GOP and the number of ECC blocks of the compressed audio data in the object GOP.

Here, the ECC block offset address of the compressed audio data exhibits the same function even when it is an address from the head position of the MVF file. In this case, however, the amount of storage increases compared to that of the case of the offset address.

When the recording operation ends, the PPC file 21 having the same content as the formed MAP file 32 is formed in the management file directory 2. This is due to the reasons described below. The MAP file 32 is for managing the MVF file 31 that effects the editing and erasing. On the other hand, the PPC file 21 enables the user to prepare a content at any position by utilizing the thumbnail after the contents have been recorded. The editing operation will be described later.

Figure 8:
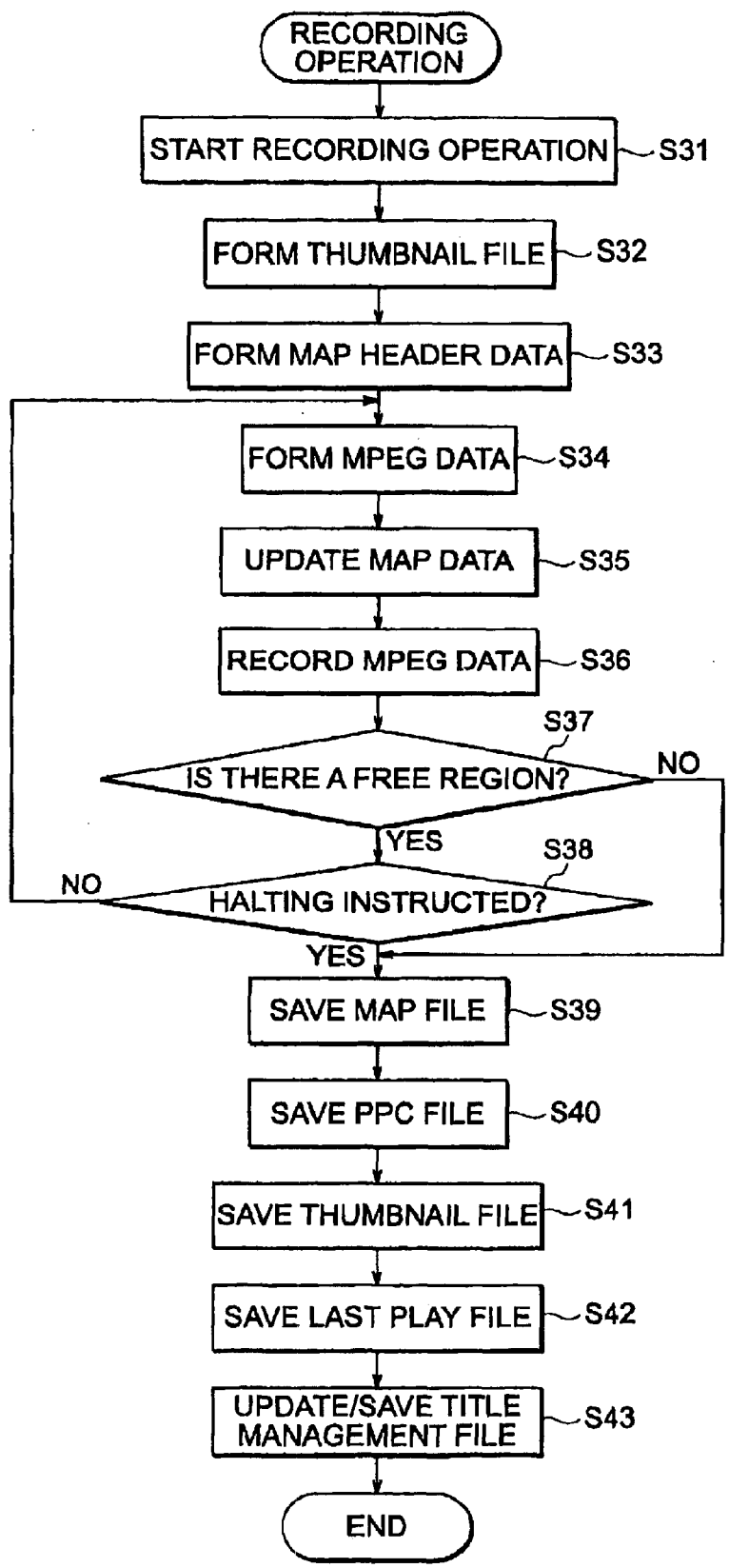
FIG. 8 is a flow chart illustrating the recording operation of the disc recording/playback device of the invention.

FIG. 8 is a flow chart illustrating the recording operation. The recording operation starts in response to a recording instruction from the operation unit 47 (step S31). First, a contracted head video at the start of the contents is formed as a thumbnail file (step S32) and is stored in the memory unit 46. Then, a MAP header data is formed in the MAP file 32 of the video file directory 3 (step S33). The MAP header data indicate under what conditions the MVF file was encoded. The header data include a maximum encoding rate, a GOP structure, horizontal resolution/vertical resolution of input video, etc. The video data are compressed and encoded by the MPEG2 video encoder 41, and the audio data are compressed and encoded by the MPEG audio encoder 53. The MPEG2 video encoder 41 forms the compressed video data, and the MPEG audio encoder 53 forms the compressed audio data.

The multiplexer 48 forms a stream in order of compressed video data and compressed audio data for every GOP in a unit of ECC block (step S34). The formed stream is recorded as MPEG data in the MVF file 31 (step S36). The MAP data are updated simultaneously with the recording of MPEG data for every GOP (step S35). Next, it is judged whether the optical disc 50 has a free region (step S37). When the optical disc 50 has the free region, the above operation is continued until a stop instruction is input from the operation unit 47 (step S38).

When the optical disc 50 has no free region or when the stop instruction is input from the operation unit 47, the MAP file 32 is preserved(step S39). Then, the PPC file 21 having the same content as the MAP file 32 is saved (step S40). Further, the thumbnail file 12 is updated/saved by using thumbnail data formed at the start of the recording (step S41). Then, the name of the recorded content and the position of starting the recording are saved in the last play file 14 (step S42). Finally, the title management file 11 is updated/saved (step S43).

Next, described below is the operation for playback of the recorded contents. In this embodiment, a plurality of video contents are stored in a piece of disc storage medium, i.e., stored in a manner of MVF file #1, MVF file #2 in a piece of optical disc.

After the optical disc (or cartridge) is inserted in the playback device, the user selects the content and instructs the playback. The PPC file 21 corresponding to the specified content is read out from the management file directory 2 and is stored in the memory unit 46. Here, when there exists the thumbnail file 22 corresponding to the specified content, the thumbnail file 22 is read out from the management file directory 2 and is stored in the memory unit 46.

Further, the MAP file 32 corresponding to the MVF file 31 to which the PPC file 21 makes a reference is read out and is stored in the memory unit 46. Then, the GOP data are re-constituted according to the order of playback GOPs specified by the PPC file 21. The data are read out from the MVF file 31 according to the GOP data. The data that are read out are separated by the demultiplexer 49 into the compressed video data and the compressed audio data. The compressed video data are decoded by the MPEG2 video decoder 42 and the compressed audio data are decoded by the MPEG audio decoder 54. Here, when there exists the thumbnail file 22 prepared by the user through the editing operation, the reproduction can be started from any GOP position by using the thumbnail data and the GOP position specified by the thumbnail data in the edited content.

Further, the following method can be contrived as a playback method equivalent to the sequential media such as video tape and the like. The MAP files 32 are arranged in order of recording the date and the time, the GOP data are rearranged relative to the disc or relative to the whole discs in the cartridge, and are reproduced in order of updating the recording date and hour. Without specifying the contents, therefore, the user is allowed to view the whole contents in the disc in order.

Figure 9:
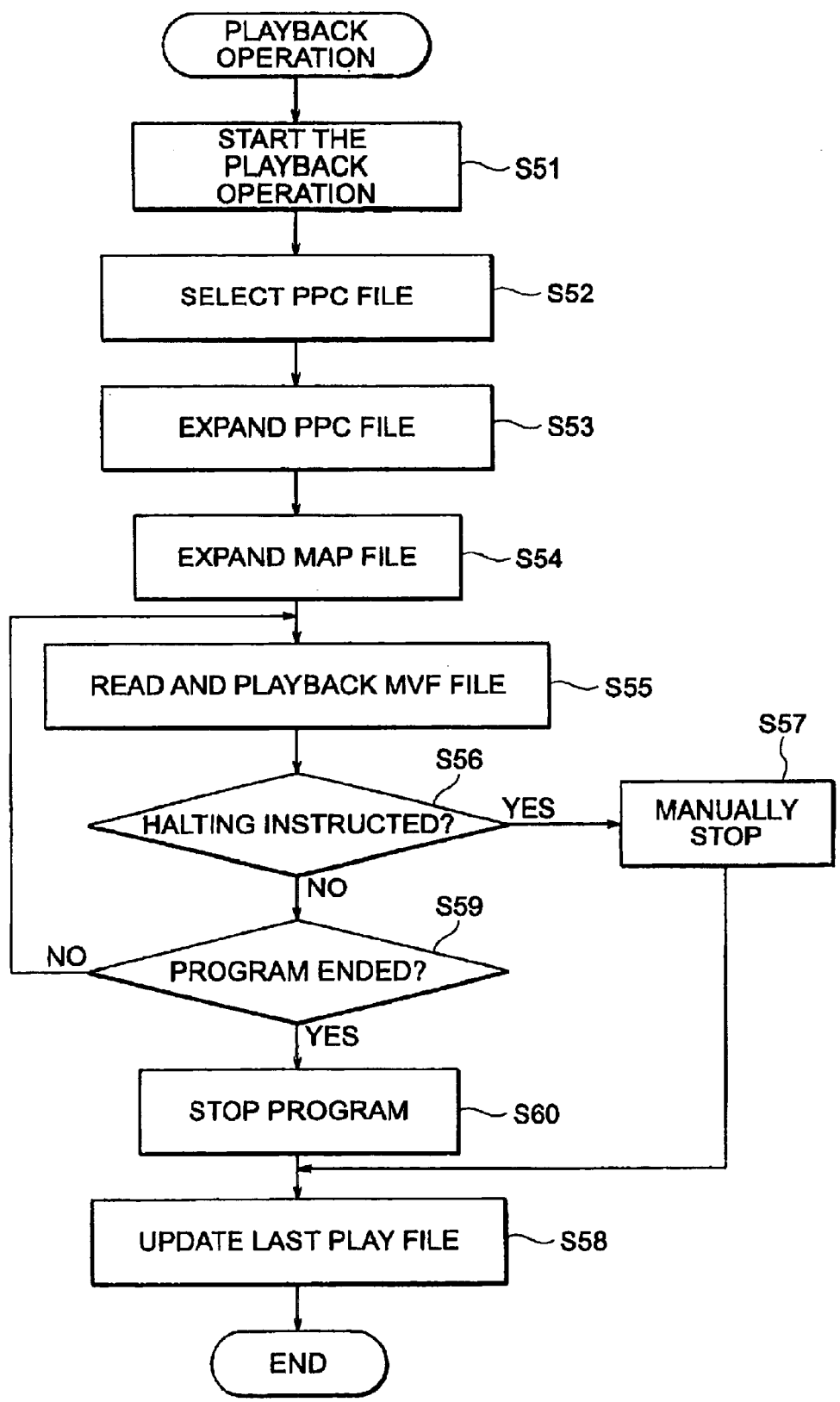
FIG. 9 is a flow chart illustrating the playback operation of the disc recording/playback device of the invention.

FIG. 9 is a flow chart illustrating the playback operation. The user selects a content that is to be reproduced by using the operation unit 47. The playback operation starts in response to a selected instruction of playback (step S51). In selecting the content that is to be reproduced, the user can be informed of the playback end position of the previous time by using data read out from the last play file 14. The user is further allowed to know the data of a content that was recorded but has not been reproduced.

As the playback operation starts, the PPC file 21 of the selected content is selected (step S52). Then, the selected PPC file 21 is read out from the management file directory 2 of the optical disc 50 and is expanded in the memory unit 46 (step S53). The MAP file 32 referred to by the PPC file 21 is read out. Then, the above-mentioned data such as reference MVF file name for every GOP, ECC block address, number of ECC blocks, and number of ECC blocks of the I-Picture in the GOP are expanded in the memory unit 46 according to an editing program in the PPC file 21 (step S54). According to the GOP data, the compression data are read out from the optical disc 50. Thereafter, the compressed video data/compressed audio data that are read out are decoded to reproduce the content (step S55). Here, when a stop instruction is input from the operation unit 47 (step S56), a manual stop processing is executed (step S57) and the last play file 14 is updated (step S58). Despite no stop instruction is input from the operation unit 47, further, it is judged whether the program has ended (step S59). When the program has not been ended, the routine returns back to the step S55. When the program has ended, the program stop processing is executed (step S60) and the last play file 14 is updated.

In the case of the playback from a given GOP position by using the above-mentioned thumbnail file 22, the MAP file is expanded and the address jumps to the ECC block address specified by the GOP position that has been specified, to start the processing for reading and reproduce the MVF file 31.

Described below is the operation for editing the recorded content. The editing operation can be executed by the following two kinds of editing methods. A first editing method is to edit the GOP data only of the PPC file 21. A second editing method is to partly delete the MVF file 31 and to reconstitute the data of the MAP file 32.

First, described below is the method of editing the GOP data only of the PPC file 21. The user may wish to reproduce the recorded content while jumping over undesired portions such as commercial message portions. In this case, the frame position to be jumped over is specified and the GOP data in the PPC file 21 is changed, to reproduce the content jumping over undesired portions. That is, the position data of playback start frame and the position data of playback stop frame in the GOP in the PPC file 21, are rewritten. By using the position data of playback start frame and the position data of playback stop frame, whether the decoded video data be output to the display 44 or not is instructed at the time when the MPEG video encoder 41 decodes the compressed video data.

The editing operation in this case is conducted in such a manner that the content to be edited is reproduced and, when, for example, the video that is to be cut starts, the operation key is manipulated to instruct the cutting. When the video that is to be reproduced starts, on the other hand, an end of cutting is instructed. Due to the input of this instruction, undesired portions are detected from the PPC file 21 and the GOP position data are changed.

Further, it may often be desired to reproduce the video data while combining them. This is done in a manner as described below. The position of a playback stop frame of an MVF file that is to be combined and the position of a playback start frame of another MVF file are specified to re-constitute the GOP data in the PPC file. Thus, the video data are continuously reproduced without really combining the video data.

Figures 10, 11, 12:
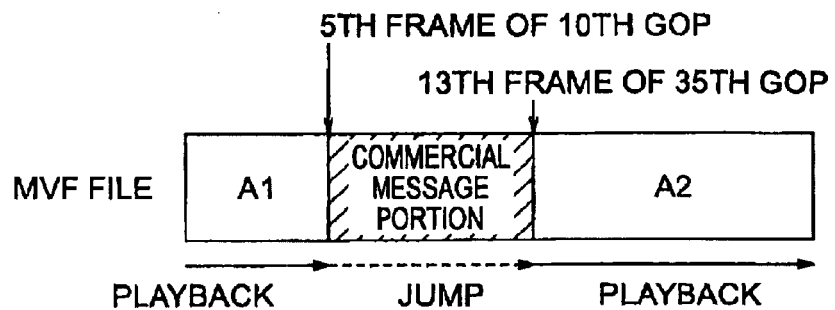
FIG. 10 is a diagram illustrating an example of cutting a commercial message portion from the MVF file.
FIG. 11 is a diagram illustrating the GOP data in the PPC file of before the editing operation.
FIG. 12 is a diagram illustrating the GOP data in the PPC file after the editing operation.

An example of cutting the commercial message will now be described with reference to FIGS. 10, 11, and 12. Described below is an example of cutting the commercial message portion from the MVF file 31 shown in FIG. 10. As shown in FIG. 11, in the PPC file 21 are stored ECC block address from the start position of MVF file, number of ECC blocks in the GOP, number of ECC blocks of the I-Picture in the GOP, start frame position and end frame position in the GOP, ECC block address of the compressed audio data and number of ECC blocks of the compressed audio data, as GOP data. For example, a tenth GOP is constituted by 13 ECC blocks from the 292-th ECC block. The I-Picture is constituted by 3 ECC blocks among them, and the first frame through up to the 15-the frame are reproduced. In the audio data, the offset address is 12. Therefore, the practical ECC block address on the MVF file is constituted by one ECC block from the 292+12=304-th ECC block.

Referring to FIGS. 11 and 12, when the commercial message is to be deleted from the fifth frame in the tenth GOP through up to the twelfth frame in the 35-th GOP, the end frame position of the tenth GOP in the PPC file 21 is changed from 15 to 4. Further, the data are deleted from the eleventh GOP up to the 34-th GOP, and the start frame position of the 35-th GOP is changed from 1 to 13. Due to a change in the PPC file 21, the MPEG2 video decoder 42 produces an output to the display 44 from the first frame through up to the fourth frame after the playback of the tenth GOP is started. Then, the MPEG2 video decoder 42 outputs the reproduced video to the display 44 starting from the thirteenth frame in the 35-th GOP.

In editing the video and audio data, the video portion can be erased by either erasing the video in a unit of the GOP or in a unit of the frame. The erasure in a unit of the GOP is such that when the GOP is constituted by, for example, 15 frames as a unit, then, the video and audio data can be erased in a unit of 15 frames. In this case, the MVF file 31 is erased in a unit of the GOP. When the video is to be erased in a unit of the frame, the video data are not simply erased in a unit of one frame, since the video data formed by the MPEG2 video encoding system have been stored in the MVF file 31. Therefore, the position data of the start frame and the position data of the end frame in the MAP file are rewritten to realize the same function as the erasure.

Figures 13, 14:
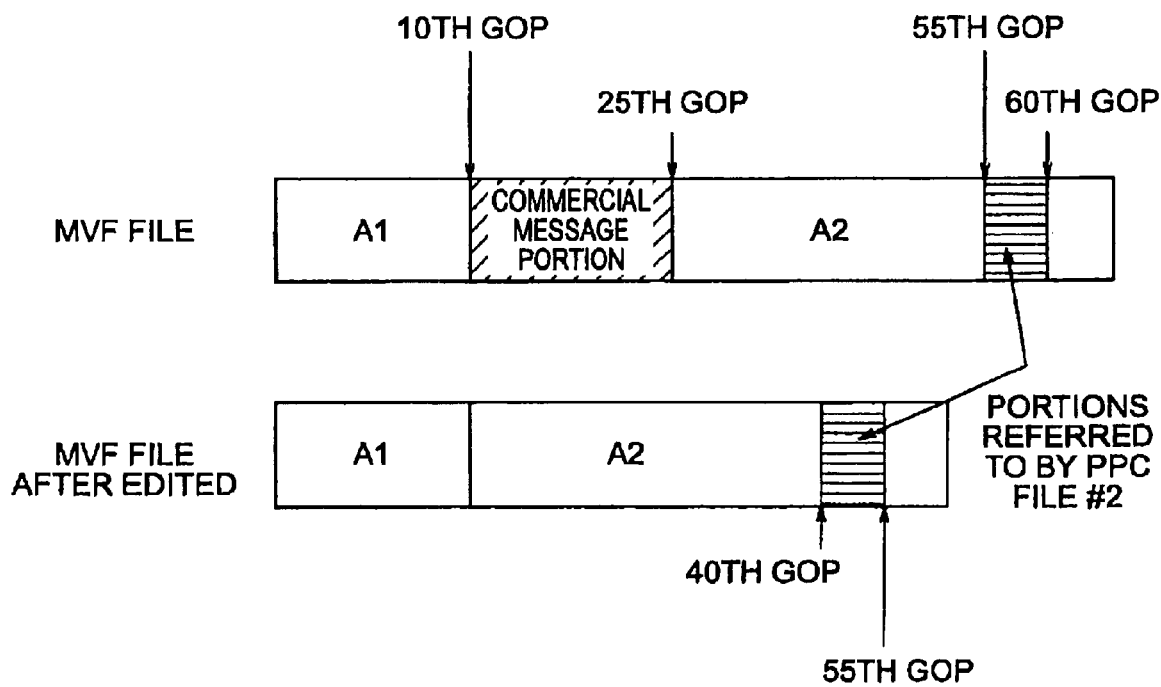
FIG. 13 is a diagram illustrating an example of cutting the frames in the GOP.
FIG. 14 is a diagram illustrating an editing operation for changing the MVF file.

FIG. 13 illustrates an example of the GOP constitution, wherein the I-Picture of an intraframe encoding video is denoted by I and the P-Pictures of an expected video in the forward direction are denoted by P. The B-Pictures of an expected video in both directions are denoted by B. Frame numbers in the GOP are attached to I, Ps and Bs. For example, P4 stands for a P-Picture of the fourth frame in the GOP.

Here, even if it is attempted to delete the ninth up to twelfth frames of the GOP, this deletion cannot be accomplished. This is because P10 is necessary for reproducing B7 and P12. To delete the frames that are to be edited from the MVF data, therefore, the object GOP must be reproduced and must be encoded again. This means that the processing becomes complex.

In this embodiment, when the video is to be erased in a unit of the frame, the following method is employed without really deleting the data. The position of the playback start frame and the position of the end frame are specified to the MAP file 32, and the MPEG2 video decoder 42 is operated so that undesired frames are not displayed at the time of playback. As a result, the user is allowed to see and hear the content same as the content deleted in a unit of the frame.

Next, described below is a case where the MVF correlation management file (LNK file) 13 is used. The LNK file 13 is for managing the conflict of the PPC file 21 which is referring to the MVF file 31 that is to be erased when the editing operation is carried out inclusive of erasing whole or part of the MVF file 31. The LNK file 13 is storing the PPC file name corresponding to a given MVF file name and a GOP position referred to by the MVF. The conflict can be managed in a simplified manner even by the PPC file name only corresponding to the MVF file name.

For example, it is presumed that the MVF file 31 is referred to by the two PPC files 21. In this case, when it is attempted to delete the MVF file 31 by using one PPC file 21, it will be understood that the MVF file 31 is referred to by another PPC file 21 by making reference to the LNK file 13. Therefore, if the MVF file is deleted, mismatching occurs in another PPC file. This can be avoided by the following two methods. A first method is to manually solve the conflict of the MVF file by the user. A second method is to automatically solve the conflict by a record editing device.

According to the first method, the user is informed of that the MVF file 31 cannot be deleted. The user deletes a portion of the MVF file that is referred to from one PPC file. This makes it possible to delete or combine the MVF file 31 that is to be edited.

According to the second method, when there exists a PPC file that is referring to an MVF file that is to be edited, the record editing device informs the user of the fact that another PPC file is making a reference to the MVF file that is to be edited. When the user continues the editing operation and partly erases the MVF file, the PPC file that is referring to the MVF file of before being edited makes a reference to an video frame which is different from the content intended by the user. Therefore, when the GOP data being referred to do not exist in the MVF file, the object GOP region is deleted from the PPC file. When the GOP data being referred to exist but when the GOP number is changed, i.e., when the GOP addresses are referred to succeeding the GOP that is deleted, conflict is avoided by renumbering the GOP address that is referred to based on the edited data.

Further, the PPC file 21 exists in each of the disc storage media in the cartridge. This means that the PPC files 2 of all discs must be checked for their conflict when the conflict is to be managed during the editing operation. This makes it difficult to execute the editing operation at a high speed. By using the LNK file 13, however, it is allowed to manage the conflict of many contents stored in the disc or in the cartridge. As a result, the editing operation is carried out at a high speed and safely.

FIG. 14 illustrates the erasure of the MVF file in a unit of the GOP. Here, the tenth GOP through up to the 24-th GOP are deleted from the MVF file, and the video data portion denoted by A1 and the video data portion denoted by A2 are combined by the editing operation. Here, it is presumed that the PPC file #2 is making reference to the 55-th GOP up to the 59-th GOP in the MVF file of before being edited. In this case, after the editing operation, the region is deleted from the tenth GOP up to the 24-th GOP, and the GOP position of the MVF file that is referred to by the PPC file #2 starts with the 40-th GOP.

The record editing device that automatically avoids the conflict works as described below. The MVF file position referred to by the PPC file #2 is behind the region that is deleted. Since 15 GOPs are deleted, the reference start GOP address changes from the 55-th GOP to the 40-th GOP. Similarly, the reference end GOP changes from the 59-th GOP to the 44-th GOP.

When the editing operation is carried out inclusive of deleting the region, there arouses a problem in that the GOP position being referred to deviates if there exists a PPC file that is making a reference to the MVF file that is to be edited. Therefore, the LNK file is used to effect the management so that the logical number will not be deviated.

Figure 15:
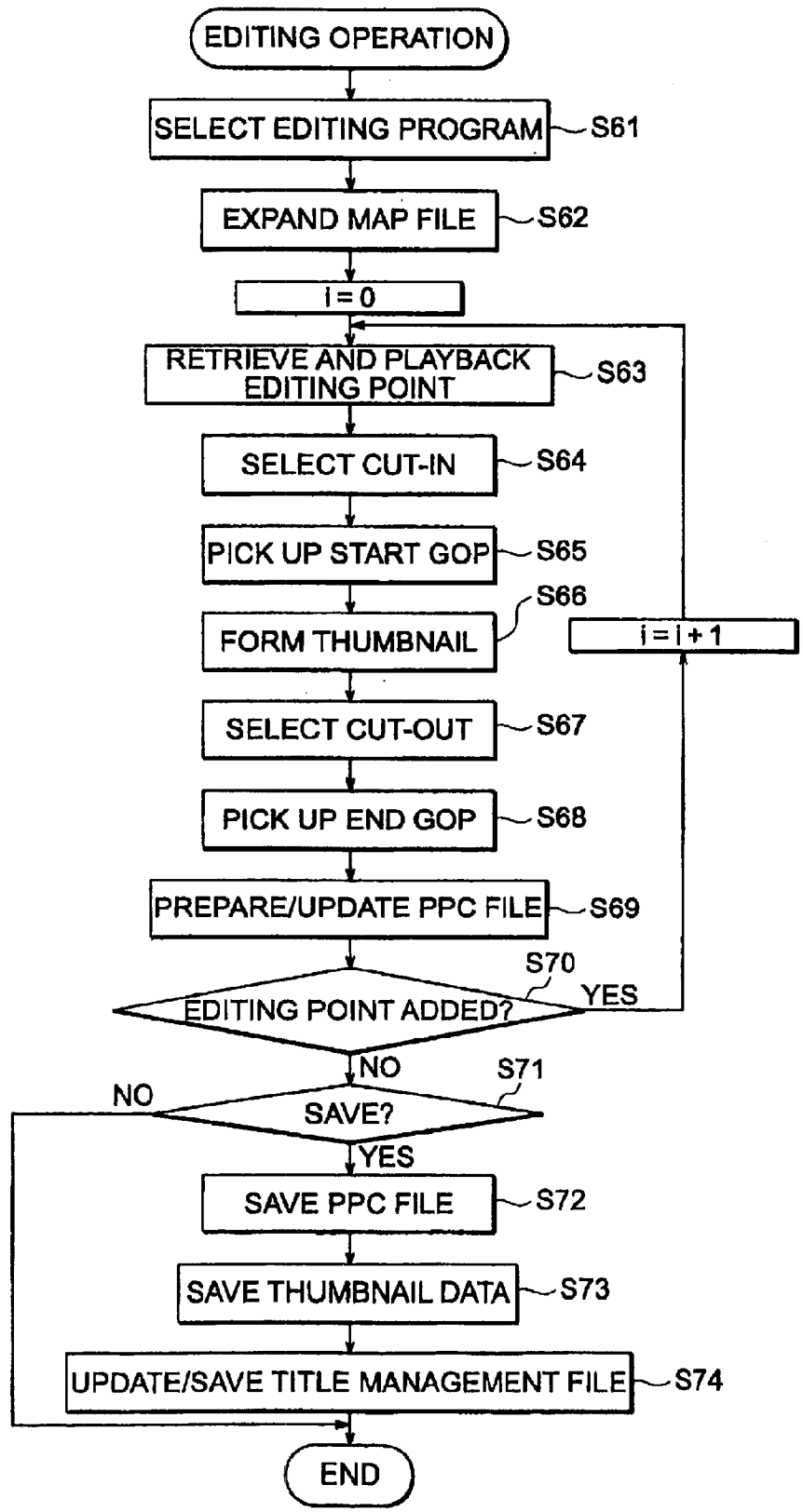
FIG. 15 is a flow chart illustrating the editing operation of the disc recording/playback device of the invention.

FIG. 15 is a flow chart illustrating the editing operation. The editing operation starts as an editing instruction is inputted from the operation unit 47. An editing program is selected at step S61. When a content to be edited is selected, the corresponding PPC file 21 and MAP file 32 are read into the memory unit 46 from the optical disc 50 through the optical disc unit 40 (step S62) to start the playback operation.

At step S63, an editing point is retrieved. The user cuts in the editing point at a position of video data or audio data that are to be inserted (step S64). A start GOP position after cut-in is picked up (step S65), and a thumbnail video after cut-in is formed from the reproduced video (step S66). Next, the video data and/or audio data to be deleted from the editing point are selected and are cut out (step S67) by the user. Further, the end GOP position after cut-in and cut-out is picked up (step S68). Due to the start GOP position and the end GOP position that are picked up, a PPC file 21 is newly prepared or is updated (step S69). At step S70, it is judged if further editing is desired. When there is an additional editing, the routine returns back to step S63 to effect the same editing as the one described above.

At step S71, it is asked if the results of editing be saved. When the edited results are to be saved, the MAP file 32 is updated, and the PPC file 21 and thumbnail file 22 are prepared or updated and are saved in the optical disc 50 (steps S72, S73). Then, the title management file 11 and LNK file 13 are updated and saved in the optical disc 50 (step S74).

FIG. 18 is a diagram illustrating the GOP constitution according to the invention, and shows an example where the I-Picture is arranged at the head of GOP. The position for arranging the I-Picture is not limited to the head. Upon arranging the I-Picture at the same position of the GOPs, however, the position data of the I-Picture as the data of MAP file 32 can be omitted from the GOPs.

FIG. 19 is a diagram illustrating the form of the MAP file 32. As shown in FIG. 19, the GOP constitution shown in FIG. 18 is recorded in the MAP file 32. A system header is set at the head of the MAP file. Then, the constitutions of GOP1, GOP2, GOP3 are recorded. Concretely, there are stored an ECC block address, number of ECC blocks, and number of I-Picture blocks. In the case of GOP1 shown in FIG. 18, for example, there are recorded 1, 10 and 2 as the ECC block address, as the number of ECC blocks and as the number of blocks of the I-Picture. In the case of GOP 2, there are recorded 11, 10 and 3 as the ECC block address, as the number of ECC blocks and as the number of blocks of I-Picture. Similarly, in the case of GOP 3, there are recorded 21, 11 and 2 as the ECC block address, as the number of ECC blocks and as the number of blocks of I-Picture.

FIG. 20 is a diagram illustrating the order of picking up the I-Pictures. Upon the input of operation by the user, the control unit 45 picks up the I-Pictures only from the GOPs according to the record in the MAP file 32 shown in FIG. 19. The video data of the I-Picture is decoded through the MPEG2 video decoder 42 and is displayed on the display 44. Therefore, a quickly fed video can be prepared by a simple procedure. For instance, the user makes a reference to the quickly fed video to efficiently carry out the editing operation. That is, in effecting the MPEG2 compression-encoding, the I-Picture serves as a base for creating a difference from other frames. The I-Picture itself is not compressed as a piece of frame video. Upon continuously picking up and reproduce the I-Pictures only, therefore, there can be reproduced a quickly fed video which is a perfect video for the viewer.

As described above, the embodiment makes it possible to easily reproduce a quickly fed video for assisting the editing operation or for assisting the retrieval of a desired content.

Figure 21:
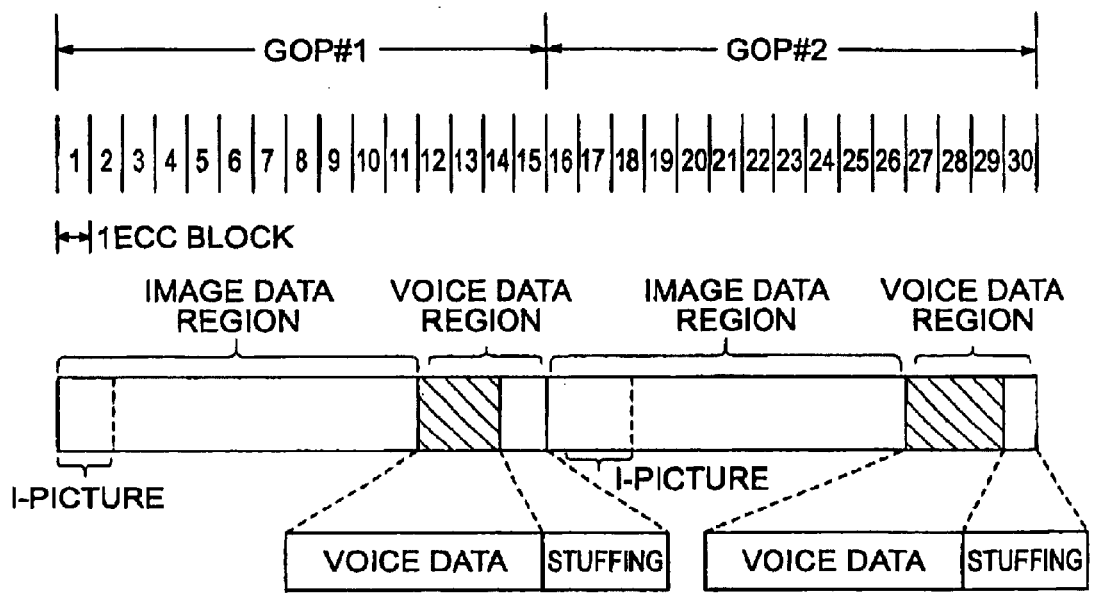
FIG. 21 is a diagram illustrating the constitution of the GOP according to another embodiment of the invention.

FIG. 21 is a diagram illustrating the GOP constitution according to another embodiment of the present invention.

Referring to FIG. 21, the GOP includes the I-Picture arranged at the head and video data as well as audio data arranged subsequent thereto. To record the GOP shown in FIG. 21 in the MAP file 32, there are recorded an ECC block address from the head of the MVF file 31, total number of the ECC blocks in the object GOP, number of ECC blocks of the I-Picture, the position data of start frame and the position data of end frame in the object GOP and the data of record start position of audio data.

Concretely speaking, in the case of the GOP #1, there are stored 1, 15, 2, 1, 15 and 12 as the ECC block address, as the total number of ECC blocks, as the number of ECC blocks of I-Picture, as the start frame, as the end frame and as the record start position of audio data. In the case of the GOP #2, there are stored 16, 15, 3, 16, 30 and 27 as the ECC block address, as the total number of ECC blocks, as the number of ECC blocks of the I-Picture, as the start frame, as the end frame and as the record start position of audio data. A predetermined region is assigned for the audio data region, and the free region is stuffed.

Figure 22A:
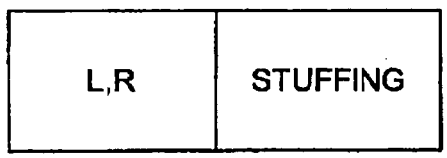
FIGS. 22A to 22D are diagrams illustrating examples of dividing the audio data region according to the invention.
Figure 22B:
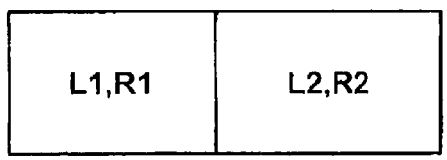
Figure 22C:
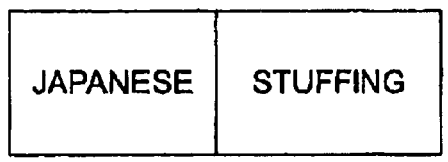
Figure 22D:
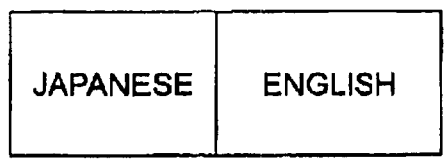

FIGS. 22A to 22D are diagrams illustrating examples of dividing the audio data region. FIG. 22A illustrates an example of a stereophonic one channel. In FIG. 22A, the audio data region is divided into two, the one region being recorded with the stereophonic L-channel and R-channel, and the other region being stuffed. FIG. 22B illustrates an example of stereophonic two channels. In FIG. 22B, the audio data region is divided into two, the one region being recorded with the stereophonic L1-channel and R1-channel, and the other region being recorded with the stereophonic L2-channel and the R2-channel. FIG. 22C illustrates an example of a monotonic audio. In FIG. 22C, the audio data region is divided into two, the one region being recorded with Japanese and the other region being stuffed. FIG. 22D illustrates an example of a bilingual. In FIG. 22D, the audio data region is divided into two, the one region being recorded with Japanese and the other region being recorded with English.

Thus, the audio data recording region has a unit of ECC block. It is therefore allowed to exchange the audio data only or to insert the audio data in the free region without correcting error in the compression-encoded video data at the time of editing audio. As a result, the audio data can be edited separately from the editing of video.

Thus, the user is allowed to record or reproduce the video by selecting either the stereophonic one channel or the stereophonic two channels for the audio data, or to record or reproduce the video by selecting either Japanese or English. Or, the sound effect or any other audio data may be added afterward to the audio data initially recorded at the time of recording the video, and may be reproduced simultaneously.

What is claimed is:

1. A method for editing video and/or audio data recorded in a disc storage medium, the method comprising the steps of:

compressing and encoding video and/or audio data to be stored as titled files in the disc storage medium;

storing the compressed, encoded video and/or audio data in the disc storage medium as a respective data file for each of said titled files, each said data file having plural blocks that each has a uniform length and plural frames of the compressed, encoded video and/or audio data;

for each of said titled files, preparing a respective map file that includes address data for the blocks and frames of the respective said data file;

inputting editing instructions for one of said title files that change the respective map file by deleting the address data for ones of the blocks to be edited out and changing the address data for the frames in ones of the blocks to be shortened by editing; and changing the respective map file based on the editing instructions.

2. The method of claim 1, further comprising the step of deleting one of said titled files by erasing the respective map file.

3. A device for editing video and/or audio data recorded in a disc storage medium, the device comprising:

means for compressing and encoding video and/or audio data to be stored as titled files in the disc storage medium;

means for storing the compressed, encoded video and/or audio data in the disc storage medium as a respective data file for each of said titled files, each said data file having plural blocks that each has a uniform length and plural frames of the compressed, encoded video and/or audio data;

means for preparing, for each of said titled files, a respective map file that includes address data for the blocks and frames of the respective said data file;

means for inputting editing instructions for one of said title files that change the respective map file by deleting the address data for ones of the blocks to be edited out and changing the address data for the frames in ones of the blocks to be shortened by editing; and means for changing the respective map file based on the editing instructions.

4. The device of claim 3, wherein said means for inputting is further for deleting one of said titled files by erasing the respective map file.

* * * * *